United States Patent
Schaefer et al.

[11] 3,980,811
[45] Sept. 14, 1976

[54] CONTACTING PICKUP OPTICAL REPRODUCTION SYSTEM

[75] Inventors: Louis F. Schaefer, Palo Alto; Philip J. Rice, Atherton; Hugh F. Frohbach, Sunnyvale, all of Calif.

[73] Assignees: Nihon Denshi Kabushiki Kaisha, Tokyo; Sharp Kabushiki Kaisha, Osaka, both of Japan

[22] Filed: Sept. 3, 1974

[21] Appl. No.: 502,810

[52] U.S. Cl. .......................... 178/6.6 R; 178/6.7 A; 179/100.41 L; 179/100.3 V
[51] Int. Cl.² ........................................ G11B 11/12
[58] Field of Search ........... 178/6.6 A, 6.7 A, 6.6 R; 179/100.41 L, 100.3 V, 100.3 B, 100.3 L, 100.3 E

[56] References Cited
UNITED STATES PATENTS

| | | | |
|---|---|---|---|
| 3,235,672 | 2/1966 | Beguin | 179/100.3 V |
| 3,404,224 | 10/1968 | Revelo | 178/6.7 A |
| 3,654,401 | 4/1972 | Dickopp | 179/100.3 V |
| 3,818,148 | 6/1974 | Dickopp | 179/100.41 L |
| 3,855,426 | 12/1974 | Bouwhuis | 179/100.41 L |

*Primary Examiner*—Bernard Konick
*Assistant Examiner*—Alan Faber

[57] ABSTRACT

A contacting pickup optical waveguide reproduction system and method for reproducing information carried on a recording medium. The recording medium is of the type having optically reflective pits formed in an information path. Information is stored as a function of pit modulation. The system includes an optical pickup adapted to slidably contact an information path along a recording medium and means for illuminating the pits. Optical waveguide means is provided for receiving illumination reflected by said pits and an optical-to-electrical energy transducer is coupled to said optical waveguide means. A particular embodiment includes a remote optical-to-electrical energy transducer.

5 Claims, 10 Drawing Figures

CONTACTING PICKUP OPTICAL REPRODUCTION SYSTEM

Cross-References to Related Applications

SINGLE LENS MULTI-BEAM SYSTEM FOR HIGH RESOLUTION RECORDING OF INFORMATION AND ARTICLE, Ser. No. 502,558, filed Sept. 3, 1974, invented by Donald R. Cone, assigned to common assignees.

MULTIPLEX RECORDING TECHNIQUE, Ser. No. 502,509, filed Sept. 3, 1974, invented by Louis F. Schaefer and assigned to common assignees.

BACKGROUND OF THE INVENTION

This invention relates generally to a system and method for reproducing information carried on a recording medium and more particularly to an electro-optical reproducing system.

Recording and reproduction systems in which wideband information, such as video and digital information signals, is recorded on a recording medium are known. These systems employ pickups which track information paths, such as grooves and read the recorded information. In order to reproduce wideband signals the speed of the disc is relatively high resulting in short or limited reproduction time. Both contacting and non-contacting pickups are known. In the former record and pickup life is short because of contacting surface wear. Non-contacting systems require a sophisticated servo-mechanism to position the pickup relative to the disc. Contacting pickup systems require high contact pressures to achieve tracking and to minimize pickup bounce. Systems heretofore have suffered from excessive complexity and have limited bandwidth, limited pickup lifetime and excessive disc speeds.

Thus there is a need for a contacting pickup optical reproduction system having improved record and stylus life, inproved bandwidth, reduction in disc speed and increased reproduction time.

SUMMARY OF THE INVENTION AND OBJECTS

Accordingly, it is a general object of the present invention to provide an improved contacting pickup optical reproduction system and method for reproducing information carried on an information path along a recording medium.

It is a particular object of the present invention to provide a wideband optical disc reproduction system having a contacting pickup capable of reproducing wide bandwidth information with improved disc and pickup life, and a relatively low disc speed to thereby provide greater reproduction time on a conventional size disc.

The foregoing and other objects of the invention are achieved in a contacting pickup optical reproduction system for reproducing information carried on an information path formed on a recording medium. The recording medium is of the type having optically reflective pits formed along the information path and where the information is carried as a function of the pit dimensions and spacing along the path. The system includes a pickup body having a tip adapted to slidably contact the information path formed along the recording medium, and means for illuminating the pits. Optical waveguide means receives illumination reflected by said pits and an optical-to-electrical energy transducer is coupled to said optical waveguide means. A particular embodiment includes a remote optical-to-electrical energy transducer.

DESCRIPTION OF THE PREFERRED EMBODIMENT

Figure 1:
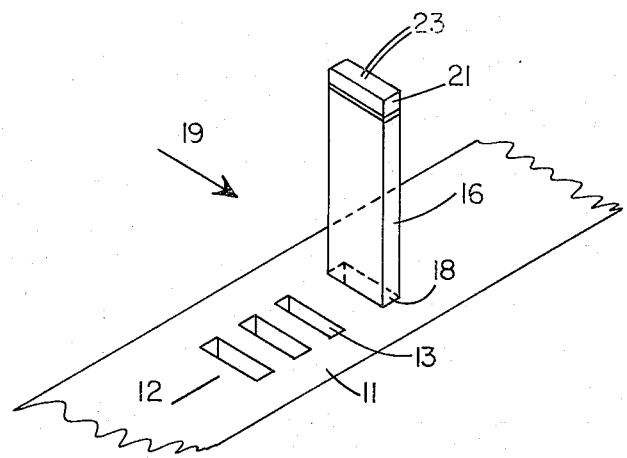
FIG. 1 is an enlarged isometric view of a contacting optical pickup slidably contacting a recording medium.

A contacting pickup optical reproduction system for reproducing wideband information, such as video or digital data, along an information path formed in a recording medium is shown in the accompanying Figures. Referring to FIG. 1 the optical waveguide pickup shown therein provides improved resolution over a microscope objective. Recording medium 11 is shown having an information path 12 formed along the surface of said medium, said path having optically reflective pits 13 formed along said path. The pit 13 dimensions and spacing along path 12 are varied to correspond to modulation of the recorded signal. Optical waveguide pickup 16 has a surface 18 which slidably contacts path 12 on medium 12. Illumination means 19 provides illumination for pits 13 and may be placed in any position relative to the pits so long as the light received by surface 18 of pickup 16 receives light modulated by the information carried by pits 13. Illumination from the side of the medium opposite path 12 may provide received light modulated as variable amplitude, scattering or diversion. Illumination from the same side as path 12 may provide received light modulated as variable density, refractive index or variable height.

Optical waveguide pickup 16 has an optical-to-electrical energy transducer coupled to modulated light propagated in the waveguide. Output lead means 23 are provided to connect the transducer to external circuitry.

Figure 2:
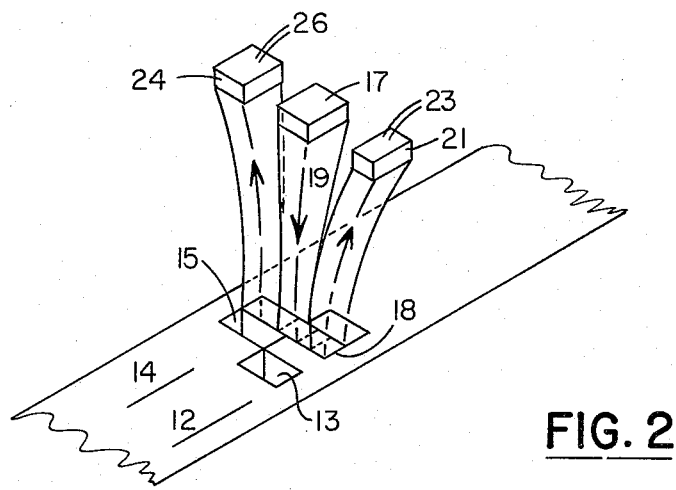
FIG. 2 is an enlarged isometric view of a contacting pickup utilizing a common waveguide for the source and reflected illumination from plural information paths on the recording medium.
Figure 3:
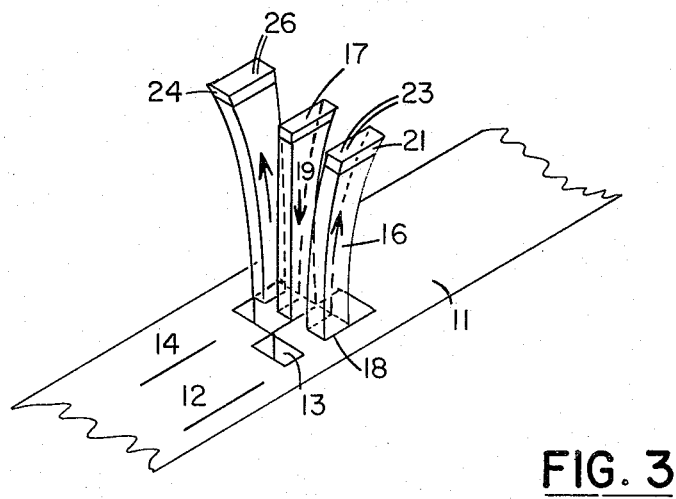
FIG. 3 is an enlarged isometric view of a contacting pickup utilizing separate source and reflected illumination waveguides.

Referring to FIG. 2, an optical pickup for reproducing an additional path 14 having pits 15 formed therein is shown. In this figure waveguide pickup 16 is configured to provide a common contacting surface 18 for a source 17 and illumination 19 therefrom, modulated light from path 12 and path 14. Transducer 24 having lead means 26 is provided to receive modulated light from path 14. FIG. 3 shows a similar configuration having separate waveguides for illumination 19 providing illumination for separate waveguide pickups. Thus it is apparent that an optical waveguide pickup has been described which provides improved resolution over a microscope objective. It is further apparent that the pickup may track along the information path utilizing a number of methods such as servo-mechanisms and other error-control methods. It is further evident that tracking in the present invention may be obtained by utilizing grooves to position the pickup, such as in a grooved disc.

Figure 4:
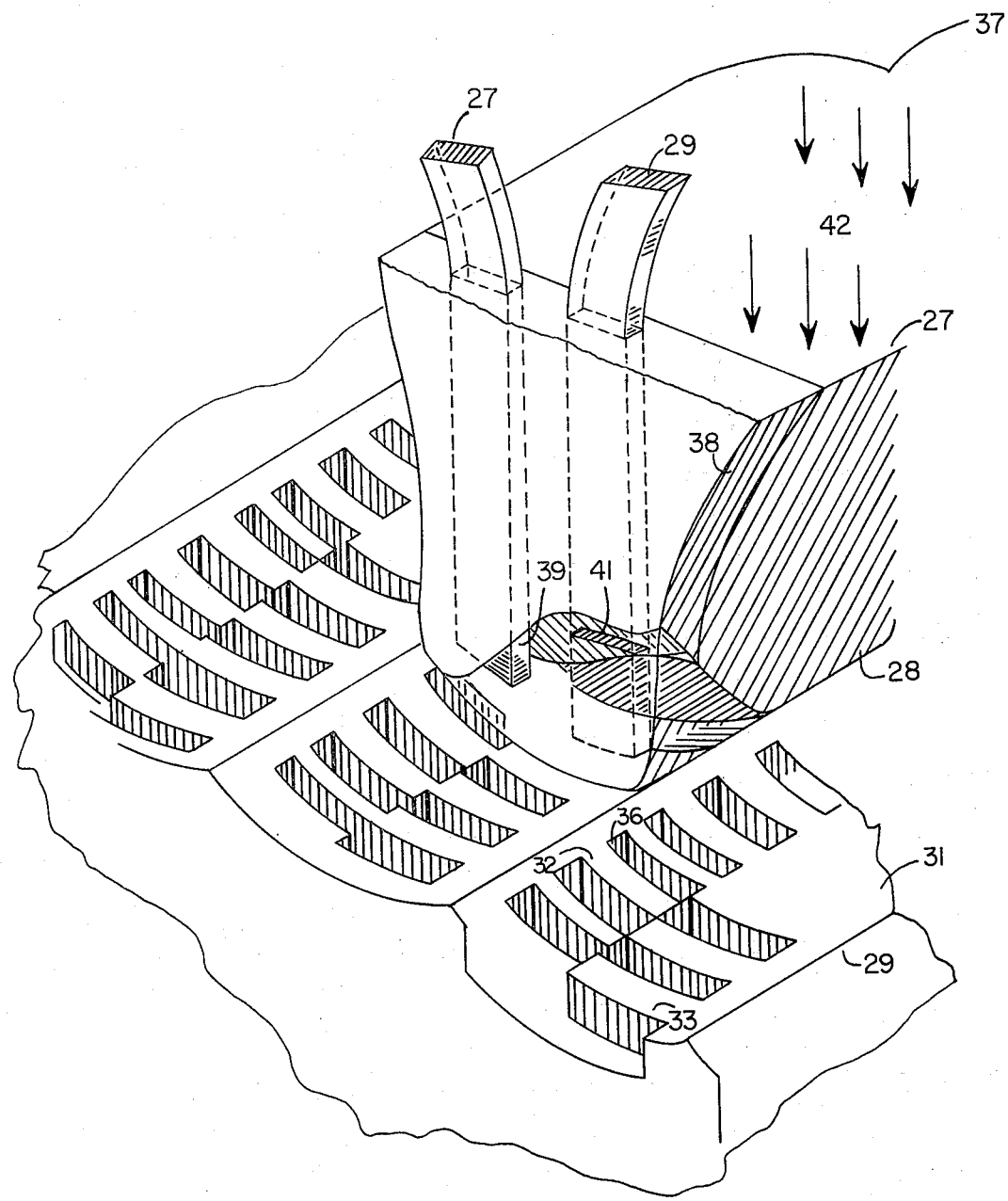
FIG. 4 is an enlarged isometric view partly in section of the tip of the contacting pickup optical reproduction system slidably contacting a grooved recording disc.
Figures 5A, 5B:
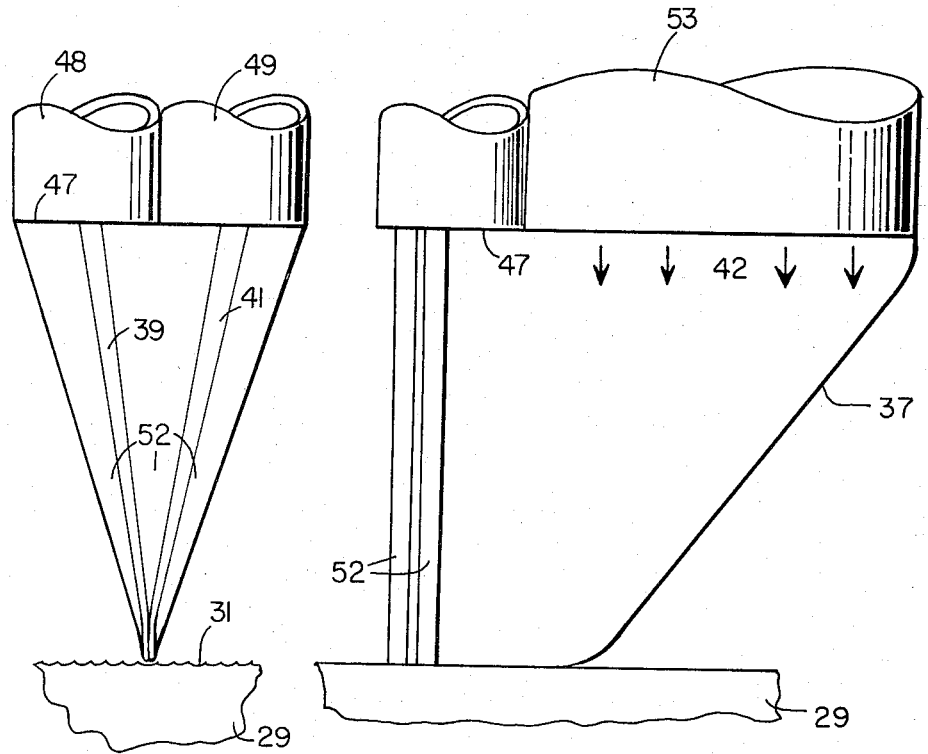
FIGS. 5a and 5b show enlarged rear and side views of the pickup including the optical piping and interfaces.
Figure 6:
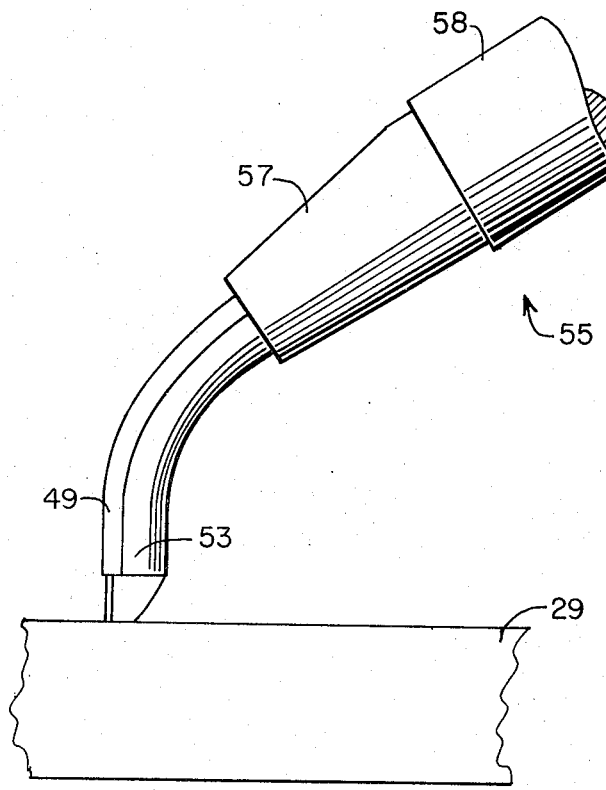
FIG. 6 is an enlarged side view showing the contacting pickup and pickup holder.

A particular embodiment of the contacting optical pickup 27 for reproducing information carried on a grooved disc is clearly shown in FIGS. 4–6 and comprises a wear resistant contacting surface or tip 28 such as a sapphire needle which slidably contacts the surface of groove 31 formed in disc 29. More particularly with reference to FIG. 4, tip 28 slidably contacts recording surfaces 32 and 33 formed in the confronting side walls of groove 31. Recording surfaces 32 and 33 have optically reflective pits 36 formed therein. Although plural recording surfaces are employed in this embodiment it is apparent that a recording surface having a single row of pits may likewise be employed.

Information is carried on the recording surfaces 32 and 33 as a function of the pit spacing and the pit dimensions, such as pit width, along the recording surface. The system for recording information on the disc and the disc are disclosed in cross referenced and related applications SINGLE LENS MULTI-BEAM SYSTEM FOR HIGH RESOLUTION RECORDING OF INFORMATION AND ARTICLE, Ser. No. 502,558, filed Sept. 3, 1974, and MULTIPLEX RECORDING TECHNIQUE, Ser. No. 502,559, filed Sept. 3, 1974.

Pickup 27 has tip 28 which passes over reflective pits 36. Pickup 27 has a leading face or surface 37 of conventional shape as will presently be seen, which relative to the moving disc 29, advances along a groove 31 self-centering within and tracking groove 31 as conventionally known in the art. Pickup 27 has a trailing face 38 which includes spaced isolated waveguides 39 and 41 which are formed in the tip 28 and contact the recording surfaces 32 and 33. Waveguides 39 and 41 extend to a surface of pickup 27 as will be presently seen.

Means is provided for illuminating the reflective pits 36 which reflect illumination toward the surfaces 32 and 33. Means for illuminating may be a local source or may preferably be illumination from a remote source 42 having an output which is coupled via the leading portion of the light-transmissive pickup to exit the pickup adjacent tip 28.

Pickup 27 has a surface 47 opposite contacting tip 28, FIGS. 5a and 5b. Waveguide 39 and 41 which are generally parallel at contacting tip 28 diverge upwardly and outwardly with respect to said tip and extend to surface 47. Fiber-optic output guides 48 and 49 interface and are in communication with waveguides 39 and 41 respectively. Cladding 52 isolates waveguides 39 and 41 from source illumination 42. Further, fiber-optic output guides 48 and 49 are isolated from illumination 42 at surface 47. Input light pipe 53 interfaces with surface 47 and is in optical communication with the leading portion of pickup 27.

The combination of the input light pipe 53 and fiber-optic output guides 48 and 49 is received by pickup holder 55, FIG. 6 which positions and holds the assembly. Output guides 48 and 49 and light pipe 53 are in an angular, upwardly curving, relationship with respect to disc 29. The combination curves upwardly and in a direction opposite the travel of disc 29. Holder 55 includes housing 57 which receives guides 48 and 49 and pipe 53. Housing 57 in turn is received by flexible tubing 58. Housing 57 may be formed of a rigid material such as metal and tubing 58 may be of compliant butyl rubber.

Figure 7:
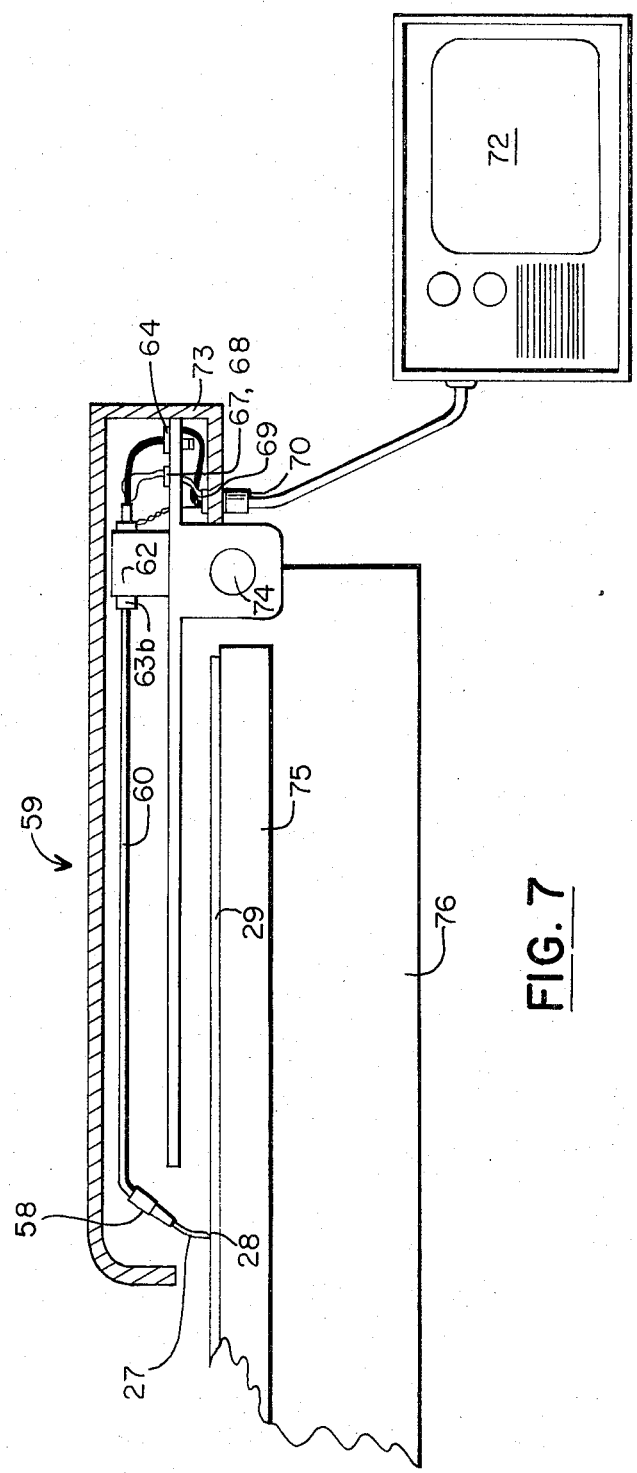
FIG. 7 is a side view of the pickup arm assembly including a support, the contacting pickup and associated optical transducers and advancing means.

Pickup holder 55 is received by pickup arm assembly 59, FIG. 7. Assembly 59 includes arm 60 supported by support 62. Arm 60 has a passage therein to pass guides 48 and 49 and pipe 63. Support 62 permits movement of arm 60 in a plane generally parallel to disc 29 and further movement generally in a plane perpendicular to disc 29. Support 62 further includes error positioning means 63b which is capable of moving arm 60 along its longitudinal axis as will be seen. Pickup assembly 59 further includes source 64 having light pipe 53 coupled thereto, and transducer 67 and 68 having output guides 48 and 49 respectively coupled thereto. The electrical outputs of transducers 67 and 68 and source 64 are further electrically connected to connector 69. A mating connector 70 has lead means connected thereto for connection to external circuitry 72 to provide voltage means for operating source 64 and amplifying means for amplification processing and display of the electrical output from transducers 67 and 68.

Pickup arm assembly 59 has a protective cover 73 attached thereto and advancing means 74 for supporting the pickup arm assembly with respect to turntable 75. Turntable 75 carried disc 29. The pickup arm assembly 59 and turntable 75 are mounted on supporting base 76.

Figure 8:
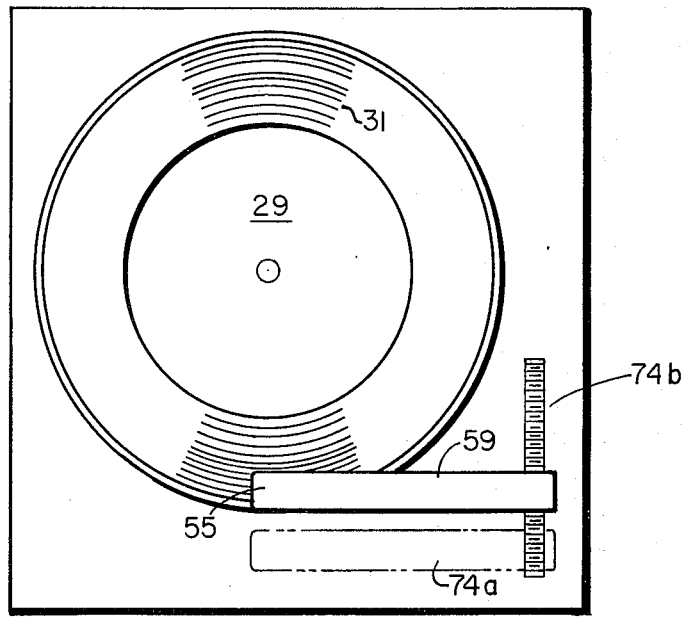
FIG. 8 is a top view of the reproduction system showing the relationship of the grooved disc, the pickup arm for positioning the pickup, and means for advancing the pickup arm across the grooved disc.

Advancing means 74 has a rest position 74a and has an advancing mechanism 74b to cause the pickup arm assembly 59 to traverse disc 29, FIG. 8. Advancing means 74 may be a lead screw, which, when engaged by a movement of pickup arm assembly 59 from the rest position 74a causes the assembly 59 to move across spirally grooved disc 29 and in constant tangential relationship thereto. Advancing means 74 generally positions assembly 59 with respect to disc 29 and pickup holder 55 maintains the specific relationship of the pickup 27 with respect to disc 29 and the grooves 31 therein.

Figure 9:
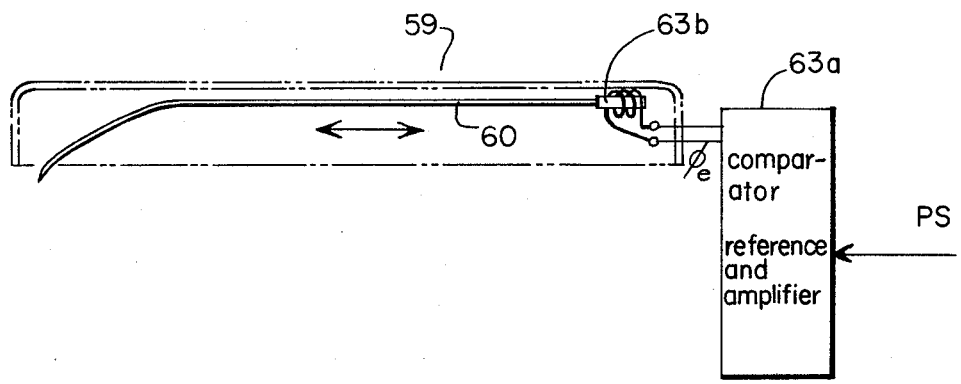
FIG. 9 is a symbolic representation of the support and error correction means of FIG. 8.

Pickup arm assembly 59 includes error positioning means 63, FIG. 9. Error positioning means 63b may be a voice coil type of support, that is, an electrodynamic transducer which when an error signal is applied causes arm 60 to move along its longitudinal axis. Electrodynamic transducer 63b is connected to comparator reference and amplifier 63a which is connected to the output of the electrical processing and display circuitry 72, previously shown in FIG. 7. A pilot signal output PS is fed to comparator 63a and compared with the built-in reference. An output signal $\phi_e$ drives transducer 63b to correct for the error in pickup positioning on the disc 29. This system compensates for eccentric runout effects, and other interactive mechanical errors in the positioning system. Precise positioning of the pickup is important in order to maintain synchronism of the displayed video picture with respect to the picture previously recorded on disc 29.

Fabrication of the mechanical and the electromechanical portions of the present reproduction system may be accomplished by conventional techniques. Briefly, as described in the previously cross-referenced application, the disc 29 may be a 12 inch reflective, rigid disc of PVC (poly-vinyl-chloride) having grooves 12 approximately 6 micrometers wide and having a depth of 1 micrometer. The recording surfaces 32 and 33 may have a width of approximately 1.5 micrometers. The disc 29 rotates at approximately 225 revolutions per minute and may have an outermost groove with a radius of 5.75 inches and an innermost groove having a radius of 3.36 inches. This provides approximately 45 minutes of playback time. With a minimum pit width of 0.35 mircometers micrometers a spacing of 0.7 micrometers along the grooves, a 2.87 megahertz signal may be reproduced from each recording surface 32 and 33. Using the multiplexing techniques described in cross-referenced MULTIPLEX RECORDING TECHNIQUE, the highest playback frequency may be effectively doubled to approximately 5.75 megahertz. Based on these systems parameters, the pickup 27 and dielectric waveguides 39 and 41 may be fabricated.

The pickup 27 may be of diamond or sapphire, the latter being preferable. The pickup may be shaped and tip 28 formed using conventional record stylus fabrication techniques. Next, fabrication techniques of the type conventionally used in intergrated circuit processing are used to fabricate the waveguides on the rear face of the sapphire pickup. A glass layer may first be formed on the rear face of pickup 27. Next, a conventional patterned resist masking step is employed and a dielectric such as tantalum is formed on the pickup face. The patterned resist permits the tantalum to form only on the exposed glass surface in those areas where the resist has been removed by conventional masking techniques. Next, the resist is removed leaving the patterned tantalum formed on the glass layer. The tantalum is then oxidized to form $Ta_2O_5$. A layer of glass is then formed as a protective coating over the tantalum oxide dielectric waveguides.

For the frequency and waveguide dimensions previously determined, the waveguide in the direction of the groove, that is along the groove, must be of a dimension small enough to resolve the highest spatial frequency recorded. As previously discussed, this dimension may be 0.35 micrometers. For the refractive indexes previously discussed, that is, an outside index of glass of approximately 1.5 and an inside index of tantalum oxide of approximately 2.2, the lowest frequency, that is, the cutoff optical wavelength for the 0.35 micrometer dielectric waveguide would be approximately 1.12 micrometers. The fiber-optic output guides 48 and 49 may be approximately 75 micrometers in diameter and the associated optical-to-electrical energy transducers 67 and 68 may be avalanche photo diodes. A typical device may be an RCA type C30811 which has a maximum sensitivity at 0.95 micrometers but has a sensitivity at its 20% points from 0.6 to 1.1 micrometers.

Further, its noise-equivalent input power is small compared to the radiant input power required for an acceptably high signal-to-quantum-noise ratio. Finally, its current gain of approximately 80 amperes/watt is large enough so that the noise introduced by the following amplifier stages is insignificant.

Light pipe 53 may be 200 micrometers in diameter and coupled to source 64. Source 64 may be chosen to provide a radiant flux density of $30S_c/N_c$ watts/m$^2$ as reflected illumination from the disc, where $S_c/N_c$ is the output-signal-to-noise-power-ratio.

This ratio is, of course, dependent on the quality of the television reproduction desired and depends considerably on the encoding and modulation schemes employed, but a ratio of approximately 5,000 or 37dB is preferred. For this ratio, the required radiant flux density is 150,000 watts/m$^2$ or 150 mW (mm)$^2$. Although a relatively high flux density, the absolute power required is very low because of the small area to be illuminated. A power level of 1 microwatt is sufficient to cover an area of 6 micrometers by 1 micrometer and is thus sufficient to flood the disc adjacent the optical waveguides. However, it is necessary in practice to cover a much greater area.

A short-arc Xenon lamp or a helium-neon laser may be used to provide the required radiant flux density. A CW diode laser or high intensity light emitting diode may also be used. It also may be possible to optimize the system to use an incandescent source.

Turning to operation of the system, the playback of a video disc is quite similar to that of a conventional audio disc. The disc 29 is placed on the turntable 75 (FIG. 8), and the turntable allowed to come up to its rotational speed of approximately 225 revolutions per minute. Next the pickup arm assembly 59 is manually moved from its rest position 74a and positioned to engage lead screw 74 and simultaneously placing pickup 27 in the initial, outside starting groove of disc 29. Once the pickup tip 28 contacts disc 29, the illumination is reflected in a manner determined by the pit 36 width and spacing. Reflected illumination thusly modulated by said pits is received and conveyed by waveguides 39 and 41 and communicated by fiber-optic output guides 48 and 49 to respective transducers 67 and 68. Since this embodiment of the system relies on the presence or absence of reflected illumination, it is relatively immune to movement or bounce of the pickup during tracking. Thus pickup pressure may be relatively low.

The output electrical signal from said tranducers 67 and 68 is decoded and summed in circuitry 72 to provide a bandwidth of somewhat less than 5.75 megahertz using the multiplexing technique disclosed in the cross-referenced application MULTIPLEX RECORDING TECHNIQUE. A pilot signal provided by the decoded and demodulated information in circuitry 72 is fed to the error positioning means 63a. Any error introduced by the electromechanical system is applied out-of-phase to electrodynamic transducer 63b which applies an equal and opposite longitudinal axis movement to arm 60 thereby cancelling the error.

Thus it is apparent that an improved contacting pickup optical reproduction system for reproducing wideband information carried on a recording medium has been provided. In particular, the particular system disclosed reproduces video bandwidth information at a relatively low disc speed and thus provide a longer playback time (approximately 45 minutes) on a conventional size disc. Moreover, lower pickup pressure results in improved record and pickup life.

We claim:
1. In a contacting pickup optical reproduction system for reproducing information carried on an information path formed on a recording medium of the type having pits formed along the information path and where the information is carried as a function of the pit dimensions and spacing along the path the system comprising a pickup body having a tip with a surface adapted to slidably contact the information path formed along the recording medium and a trailing face substantially perpendicular said contact surface, means in said pickup body for directing illumination into the pits adjacent said face, a single optical waveguide means formed on and carried by said face for each information path for receiving illumination reflected towards said face by said pits, said waveguide means extending to said contacting surface of said tip to contact the information path and having thickness in the direction of the path which is short enough to resolve the highest spatial frequency recorded along said path, and an optical-to-electrical energy transducer coupled to said optical waveguide means.

2. A system as in claim 1 wherein said waveguide means is a tapered waveguide.

3. A system as in claim 1 wherein means in said pickup body for directing illumination into the pits includes an illumination source and additional optical waveguide means carried by said face for communicating said illumination to said pits.

4. A contacting pickup optical reproduction system as in claim 1 wherein said optical waveguide comprises a dielectric waveguide formed on the surface and contacting the recording surfaces at said tip of said body, and extending to a surface of said body opposite said tip and being coupled to said transducer.

5. A contacting pickup optical reproduction system as in claim 1 wherein the means in said pickup for directing illumination into the pits includes a remote illumination source, an illumination outlet in a surface of said pickup body and a light pipe coupling said source and said outlet.

* * * * *